March 21, 1972  D. ROSENTHAL  3,651,182

METHOD OF MAKING MULTICELLULAR THERMOSET FOAMED PLASTIC BEADS

Filed April 24, 1969  2 Sheets-Sheet 1

INVENTOR.
DANIEL ROSENTHAL

BY

ATTORNEYS

March 21, 1972   D. ROSENTHAL   3,651,182
METHOD OF MAKING MULTICELLULAR THERMOSET FOAMED PLASTIC BEADS
Filed April 24, 1969   2 Sheets-Sheet 2

FIG. 2

INVENTOR.
DANIEL ROSENTHAL
BY
ATTORNEYS 3,651,182
METHOD OF MAKING MULTICELLULAR
THERMOSET FOAMED PLASTIC BEADS
Daniel Rosenthal, 525 Whitehall St.,
Lynbrook, N.Y. 11563
Filed Apr. 24, 1969, Ser. No. 818,866
Int. Cl. B29b *1/02;* B29d *27/02*
U.S. Cl. 264—51                                                10 Claims

ABSTRACT OF THE DISCLOSURE

Small, generally spherical cellulate, tough-skinned beads of thermoset plastic material. The beads are suitable for many industrial uses. The heads are made by dropletizing a thermomettable plastic material while the same is still in liquid form and while it contains a blowing agent. The conditions are such that the blowing agent is activated while the thermosettable material is in droplets. The droplets are suspended in a body of fluid so that the influence of gravity is considerably lessened. Thereby the liquid droplets tend to assume a generally spherical shape and not to agglomerate. While still in this spherical configuration the blowing agent forms cells which are able to expand because the material is liquid or gelling. However, the viscosities of the liquid and gel are sufficient to prevent the walls separating the cells from becoming so thin that the ultimate solidified beads are highly frangible. The curing, i.e., setting, time of the material is sufficiently short under the prevailing conditions to permit the cellulated expanded beads to set, i.e., cure, sufficiently for handling purposes within a commercially practical time while the beads still are suspended in the body of fluid. Thereafter the beads are extracted from the fluid and recovered for sale.

BACKGROUND OF THE INVENTION

(1) Field of the invention

Thermoset multicellular microcellular spherical beads and a method and apparatus for making the same by dropletizing thermosettable plastic material in liquid form in a fluid medium with a blowing agent included therein and under conditions to activate the blowing agent so that the droplets assume a spherical form while suspended in the fluid medium, and further so that the droplets expand as the blowing agent cellulates, the beads setting sufficiently for handling in spherical form while so suspended, and thereafter being extracted from the fluid medium.

(2) Description of the prior art

Plastic foams are well known materials of commerce. They have a variety of uses depending on their type, to wit, rigid, semi-rigid and flexible (resilient). For instance, the rigid foams can be used for such purposes as insulation and flotation, voids in boats and rafts as well as for imparting structural strength to light weight elements such as radomes. When placed between sheets, plastic foams can be used as an insulating support and roof decking and for other structural elements. The semi-rigid and flexible foams find use in other areas, for example, the flexible foam primarily being employed for cushioning, mattresses and the like.

Cut offs and scrap from rigid plastic foams are unuseable since they are too frangible and brittle for commercial reprocessing or economic fragmentizing. Flexible scrap may, however, be chopped up into small fragments and reconstituted with adhesive or a melt, but usually results in a product that is inferior to the original state of the flexible foam and which has a much higher and quite irregular density. In addition, the fragments sometimes are also used to make up cushioning of inferior quality. Such poor quality derives from the fact that scrap foam frequently is formed from foam that fails to meet specifications or from factory waste or from a high density skin of slab stock and buns and from the side and bottom trims with their many imperfections. Also, when even flexible foam is subjected to the vigorous treatment of shredding, there is an inevitable disintegration of the foamed stock so that there are particles of foam like fines which when the foam is used for cushioning can make the cushion noisy and irregular and if not lined, will seep out through fabric. A further disadvantage of shredded flexible foams is that the shredded components in addition to the fines aforementioned contain a highly disproportionate number of fragments which adhere to other skin fragments, the strength and density of which are considerably greater so that the cushioning formed therewith is much too lumpy.

It also has been proposed to supply small beads of plastic material which included a blowing agent as yet unactivated. When the beads were subjected to heat, the material would expand. The plastic used for such beads usually was polystyrene, a thermoplastic. The thermoplastic liquified upon the application of heat permitting the blowing agent to expand under heat and form cells therein. These beads, probably due to the considerably reduced viscosity of the liquid thermoplastic polystyrene, were quite fragile and, indeed, articles molded from such beads (the molding consisted of pouring a quantity of unexpanded beads into the bottom of a mold and then heating the mold to cause the beads to semi-liquify and allow the blowing agent to form gas cells, while concurrently expanding the beads so that the beads filled the mold and their tacky surfaces autogenously welded to the like surfaces of adjacent beads) were notoriously weak and were unable to withstand the vicissitudes of everyday handling, so that such articles have always been viewed with suspicion by the public. Generally speaking, thermoplastic multicellular beads have achieved only a limited degree of success in the marketplace.

SUMMARY OF THE INVENTION

It is an object of the present invention to provide a novel method for making multicellular microcellular beads which avoid the drawbacks of the prior art.

It is another object of the invention to provide a method of the character described which are such that the bead is rugged, both at its skin and internally, and is unaffected by high temperatures short of temperatures which will chemically decompose the material of the bead.

More specifically, it is an object of the invention to provide a method of the character described wherein the bead is of a thermoset plastic material, so that the material is inherently more versatile than a thermoplastic material in that it can be intrinsically stronger and more resistant to the effects of acids, alkalies and organic solvents, less affected by ageing, and does not melt (deform) upon heating.

It is another object of the invention to provide a method of producing a bead of the character described which is capable of use en masse, either physically unconnected or physically interconnected.

It is another object of the invention to provide a method of producing a bead of the character described which is capable of being made by a method and apparatus which make use of the time that the thermoset material is liquid just prior to setting, i.e., curing, sufficiently for handling purposes so that in this short pre-cure period, while the material is still liquid and then gelatinous, the bead can assume a spherical shape under proper ambient conditions and at the same time a blowing agent contained therein can be activated to form gas cells and expand the bead.

It is another object of the invention to provide a method of producing a bead of the character described in which the gel time and the cure time sufficient for handling is not so long that the beads must be kept apart for protracted periods so as to prevent agglomeration and thereby require expensive, sophisticated, complicated and bulky equipment.

It is another object of the invention to provide a method of the character described in which the beads, while being blown in the liquid and gelled states, are suspended in a body of fluid so as to largely negate the effect of gravity, whereby the surface tension of the beads pulls them into a generally spherical configuration in which they ultimately set.

It is another object of the invention to provide a method of the character described in which the gelling takes place in a well-known fashion, i.e., well known aside from the formation of beads, while the thermoset material is being either self-cured due to a catalyzed or initiated reaction or to the exothermic heat of reaction generated by the thermosettable material and/or by the blowing agents and/or by the foaming reaction, or in which the curing is achieved by externally applied heat such, for instance, as heat obtained from the aforesaid fluid medium in which the liquid and gelled but not yet fully cured beads are suspended during blowing and spherical shaping.

It is another object of the invention to provide a method of the character described in which the beads that are ultimately formed are substantially spherical as distinguished from the random polygonal shapes that are obtained from a shredding operation, and in which the surface of the beads is formed of a crust or skin which is characteristically denser, firmer and harder than the internal portions of the bead, such structurally superior crust being known in the art of molding articles in general from thermosettable materials in a foaming reaction, but not in the art of beads.

Other objects of the invention in part will be obvious and in part will be pointed out hereafter.

The invention, accordingly, consists in the features of construction, combinations of elements, arrangements of parts and series of steps which will be hereinafter described and of which the scope and application will be indicated in the appended claims.

BRIEF DESCRIPTION OF THE DRAWINGS

In the accompanying drawings in which are shown various possible embodiments of the invention.

DESCRIPTION OF THE PREFERRED EMBODIMENTS

In general, the objects of the present invention are achieved with the assistance of an apparatus that includes a mixing head into which are introduced chemical compounds that will form a liquid composition of a type that will subsequently gel and harden as a thermoset plastic. Moreover, the compounds include at least one blowing agent or chemicals which will evolve gas under the conditions that prevail in the apparatus. While the compostion is still liquid it is forced out of the mixing head, wherein the various compounds are dispersed in one another, to a dropletizing mechanism which reduces the liquid composition into discrete small slugs of liquid, the immediate physical configuration of which is not material. By way of example, one such dropletizing mechanism is a spinning disc on to which the liquid is deposited inwardly of its periphery so that the liquid is spun off the circumference of the disc in the form of droplets in a manner well known to the art. Another typical dropletizing mechanism is a pair of perforated discs, one of which is stationary and the other oscillating or rotating, the discs successively opening and closing through passageways so that the liquid issuing from the set of discs is in the evanescent state of cylindrical slugs, although this specific shape, likewise, is not material.

The droplets discharged from the dropletizing mechanism are introduced into a body of a fluid medium located within a container, the term container being very generally used to include any shape that bounds the fluid medium, which container leads from the dropletizing mechanism to a separation mechanism. While in the fluid medium the droplets are suspended to some extent which, as soon will be noted, can vary the suspension to a degree reducing the influence of gravity on the liquid droplets which thereupon, due to surface tension, approximately assume the form of spheres and tend to retain this form as long as they are sufficiently fluid to be affected by shear, whereby when the material of the droplets hardens, the droplets will be substantially spherical. The liquid medium can either be gas, e.g., air or steam, or a liquid, e.g., water, liquid fluorohydrocarbons, liquid aliphatic hydrocarbons, liquid aromatic hydrocarbons and silicone oils, chlorinated paraffins and nitroparaffins, which liquid medium is essentially chemically and physically inert to the liquid and subsequently hardened chemical composition being used. It may be mentioned that said liquid may, if desired, be capable of slightly dissolving away the skin of the beads or, by chemical reaction, of toughening such skin. Inasmuch as the droplets displace their volume of the fluid, the fluid will exert a buoying force on the droplets which effects the aforesaid gravity reducing action and encourages formation of a substantially spherical shape while the droplets are being led from the dropletizing mechanism to the separating mechanism.

The invention also may include the use of heated fluid media to supply energy to the reaction which is taking place within the individual droplets, the reaction essentially being a curing, i.e., setting, and hardening reaction which transforms the liquid composition first into a gel state and ultimately into a cured, i.e., set, stage in which it is thermoset and is not affected by high temperatures short of a temperature which will decompose the solid composition.

During the period that the droplets are suspended in the fluid medium and are being transferred from the dropletizing mechanism to the separation mechanism, the blowing agent is active, having been activated by one or more chemical compounds introduced into the mixing head or by a by-product of the reaction taking place during the process of gelation or by an exothermic heat of the thermosetting reaction or by an externally applied heat, e.g. heat supply by a heated fluid suspension medium. The blowing agent is effective, i.e., operational, to generate the gas during the period that the composition of the droplets is first liquid and then gelled, so that the blowing agent functions to form gas cells within the droplets. The liquid and gel are not sufficiently strong to resist the shear forces generated by the blowing agent so that first the blowing agent forms tiny discrete voids and subsequently enlarges the sizes of the voids into cells. However, because the cells are being formed while gelling is taking place, the partitions between the cells, and also the skins of the droplets, remain relatively thick in comparison, for instance, to the partition thicknesses and skin thicknesses of a bead of a thermoplastic resin being foamed. As the gas voids expand, moreover, the size of the droplet expands. Ultimately, by the time that the composition of the droplets has cured, i.e., set, an expanded multicellular microcellular bead will be formed and it will be formed between the point of introduction of the liquid droplets into the fluid medium by the dropletizing mechanism and the point where the finished thermoset multicellular beads are extracted from the fluid media by the separation mechanism.

Pursuant to the invention, the combined period of gelation and curing (setting) of the liquid thermosettable plastic composition is relatively short, preferably not exceeding about five minutes.

In addition to being chemically and physically inert to the liquid composition that is employed, the fluid medium should be immiscible, i.e., not a solvent, for the liquid composition, the gelled composition or the cured composition. Said medium should have a surface energy level which differs from that of the liquid thermosettable composition. If in liquid form the fluid medium preferably has a specific gravity in excess of the specific gravity of the liquid composition so that the composition will tend to rise therein. Desirably, the fluid medium is readily removable from the beads and, if expensive, should be recoverable and reusable to keep the commercial cost of operating the apparatus at a minimum.

Any suitable type of separation mechanism can be used as, for instance, a cyclone, or a sump, or a screen, the latter two being detailed hereinafter.

Any well-known type of liquid thermosettable plastic composition can be employed which comes within the parameters thus far described, to wit, it must include a blowing agent and it also must include a compound or mixture of compounds which, under proper conditions which will be made to prevail, will change to a gelled state and subsequently cure as a thermoset plastic. Typical of such compositions are the compositions used to make polyurethanes, e.g., polyether urethanes and polyester urethanes, epoxies, phenol-formaldehydes, resorcinol-formaldehydes, urea-formaldehydes, melamine-formaldehydes, polyester resins and polycarbonates. There subsequently will be described various specific liquid compositions by way of example, it being understood that the field of thermoset plastics is so well known and so at large that it would be essentially meaningless to include examples of all of the many kinds of liquids of such character over and above the compositions which will be mentioned hereinafter. The present invention also embraces, likewise by way of example, the use of the sundry thermosettable plastic compositions described in detail in the following texts, it being understood that these, too, are not limitative: "Polyurethanes" by Bernard A. Dombrow, copyright 1957 by Reinhold Publishing Corporation, in particular pages 1–66, 75–83 and 106–121; "Epoxy Resins Their Application and Technology" by Henry Lee and Kris Neville, copyright 1957 by McGraw-Hill Book Co., in particular pages 1–211; and "Rigid Plastics Foams" by Thomas H. Ferrigno, copyright 1967 by Reinhold Publishing Corporation, in particular pages 1–206, 302–314 and 323–343.

It also should be mentioned that the various liquid compositions and ensuing thermoset plastic compositions making up the multicellular microcellular thermoset plastic beads may include compositions which form beads that are either flexible, semi-rigid or rigid.

Figures 1, 3:
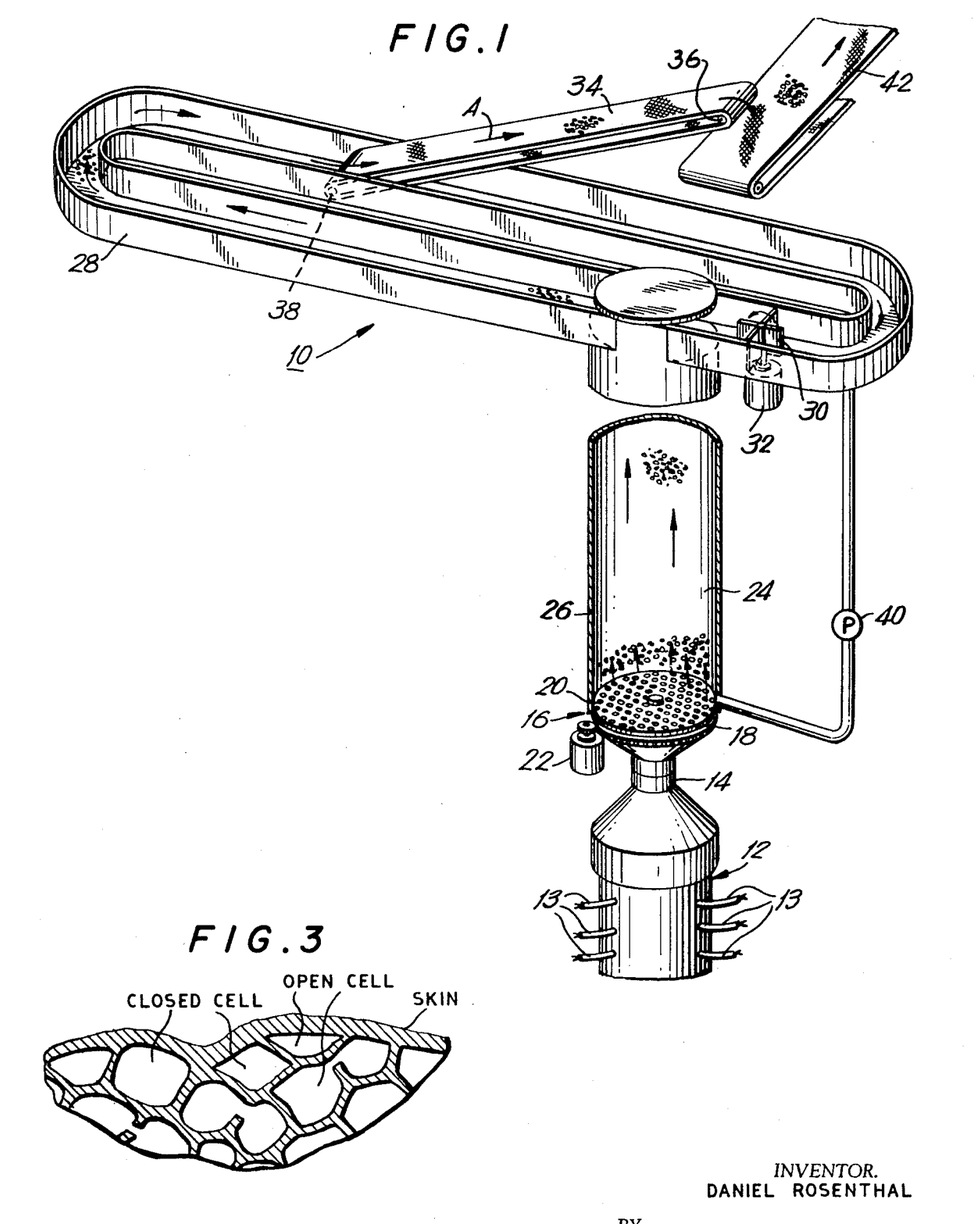
FIG. 1 is a perspective view of an apparatus for carrying out the method which results in the production of beads of the instant invention.
FIG. 3 is an enlarged cross-sectional view through a bead of the present invention.

Referring now in detail to the drawings and, more particularly, to FIG. 1, the reference numeral 10 denotes an apparatus constructed in accordance with the present invention and carrying out the method thereof for forming the unique multicellular microcellular thermoset plastic beads of this invention. Said apparatus includes a mixing head 12 into which there are introduced under pressure by continuous metered flow in proper proportions through hoses 13 all of the chemical compounds which are necessary to make up a liquid composition that will gel and cure into a thermoset plastic solid. These compositions are of types and proportions well known to the art as mentioned above. However, for the sake of completeness, specific compositions will be detailed hereinafter, these being in addition to the large number mentioned in the three references above set forth. In general, the compounds will include the necessary reactants and/or precursors which will form an initially liquid composition that quickly gels and cures sufficiently for handling purposes. Also included may be catalyzers, initiators, plasticizers, diluents, modifiers, fillers, cross-linking agents, curing agents, flexibilizers, resinous modifiers, blowing agents, surfactants, flame retardants, and the like.

The mixing head, an example of which is shown in U.S. Letters Patent 3,207,486, as is usual, includes conventional means for ensuring mutually intimate dispersion of the various compounds in one another, this including, by example, rotating agitators, static frothing type mixing chambers and pulsed high pressure feeds. The mixing head also may include heating means.

The composition as formed in the mixing head is a liquid composition and is characterized by its ability to gel and cure sufficiently for handling purposes within a relatively short time, such period of time, for the purpose of this invention, being in the neighborhood of about 15 seconds to about five minutes. Moreover, as likewise is conventional, the output fed from the head into the outlet tube 14 is under positive pressure. A preferred outlet pressure is a minimum of about one lb. p.s.i.g. with a maximum that depends upon the specific configuration and dimensions of the passageways, soon to be described, through which the fluid medium flows and, in particular, on the cross-sectional dimensions of those passageways, and also depends upon the temperature of the fluid medium, the viscosities of the liquid composition and the fluid medium and the density of the fluid medium. In accordance with standard practice, although this is not necessary, the mixing head 12 has a tapering section leading to the outlet 14.

The outlet 14 is connected to a dropletizing mechanism 16 which is shown partly in section FIG. 1. The specific dropletizing mechanism illustrated includes a lower perforated disc 18 and an upper perforated disc 20 arranged in face-to-face contact, the discs being coextensive and coaxial. The upper disc is stationary; the lower disc is journaled for rotation at its center. The openings in the discs are so oriented that as the lower disc rotates or oscillates the openings of the lower disc will alternately register with and be disaligned from the openings in the upper disc. Obviously when the openings are in registration the liquid composition discharged from the mixing head will flow in many streams through the dropletizer, but as soon as the openings become disaligned the flow will be shut off, thereby chopping the streams so that the effect of the dropletizer 20 is to discharge from the upper disc series after series of cylindrical slugs of liquid.

The lower disc 18 is associated with means to drive the same around its center either by continuous rotation or by oscillation. Said means constitutes an electric motor 22 having an output pinion (not shown) in mesh with a ring gear (not shown) mounted on the circumference of the lower disc. This arrangement is suitable for continuous rotation. Where oscillatory motion of the lower disc is desired, the motor drives a crank which engages a radial slot (not shown) in a lever (not shown) secured to the lower disc 18. In general, the operation of the dropletizing discs will be to serially block and unblock the registered openings in the two discs so as to form liquid slugs.

The liquid slugs issuing from the dropletizing mechanism are discharged into a vertical column 24 in a long, straight, erect tube 26 having its open lower end sealed to the circular large diameter outlet of the dropletizing mechanism. The vertical column 24 is composed of a fluid medium. In this particular form of the invention the fluid medium is a liquid having a specific gravity in excess of the specific gravity of the liquid composition of which the liquid slugs are composed whereby the liquid slugs will buoyantly rise in said column toward the top thereof. Suitable liquids for this column are water, liquid fluorohydrocarbons, liquid aliphatic hydrocarbons, liquid aromatic hydrocarbons, silicone oils, chlorinated paraffins and nitroparaffins. Since the droplets have a lighter unit weight than that of the fluid medium, the droplets will float toward the top of the tube 26 as schematically illustrated in FIG. 1. When the apparatus is in operation there will be a constantly replenish cloud of such rising slugs. The slugs will not tend to coalesce, being separated by the fluid medium. The fluid medium has no chemical effect upon the liquid slugs because the two are mutually immiscible and mutually chemically non-reactive. Also as noted previously, by selection of liquid compositions and fluid media differing in surface energy levels, agglomeration of the slugs is inhibited.

A characteristic of the appaartus which is of importance in the practice of the invention is that, despite the initial shape of the droplets issuing from the dropletizer, the said droplets will, because of their buoyant support in the liquid medium and the consequent net reduction of gravitational forces acting upon the droplets, also due to the surface tension of the droplets, convert from any originally issued form from the dropletizer, other than spherical, into an approximately spherical configuration without the necessity of performing any mechanical operation upon the droplets, the cost of which obviously would be prohibitive and render the invention impractical.

The droplets are introduced at the bottom of the vertical column and will rise of their own volition through buoyancy. If the described relationship of specific gravities is reversed, the droplets would be introduced adjacent the top of the column and will descend toward the bottom of the column for separation, being, during this period, buoyantly partially suspended by the liquid medium so that the droplets will assume a generally spherical configuration.

The liquid medium performs another function, to wit, it controls the speed at which the droplets rise, i.e., the rate of ascent, whereby the time elapsing from the issuance of the liquid droplets from the dropletizing mechanism to the top of the column and then in another element of this apparatus soon to be described to the separation mechanism is such that it will permit the droplets to gel and then to cure to a thermoset condition.

During this slow ascent of the droplets, the blowing agent present in the liquid composition is operative to form multiple voids (cellulate) within the droplet which is now being transformed into spherical shape. The cellular formation can take place because the droplet is still liquid and even after it has gelled still is not fully shear-resistant whereby not only are the voids (cells) formed and enlarged but the droplet is expanded. However, the ascent time and subsequent horizontal travel time is such that when the now spherical multicellular beads have reached the separation mechanism the plastic material has been cured and is thermoset, whether in flexible, semi-rigid or rigid state, as the case may be. A typical time of ascent is from 15 seconds to 3 minutes depending upon the particular liquid compositions employed, the particular liquid medium employed, the height of the column and the size of the droplets.

It should be mentioned that the extreme range of sizes for the multicellular microcellular foamed thermoset plastic beads embodying the invention is from about one five-hundredth of an inch diameter to about one-half inch diameter, the preferred range being from about one-hundredth of an inch diameter to about one-quarter inch diameter. It also should be mentioned that, depending upon the particular liquid compositions and liquid medium employed and also upon the sizes of the openings in the discs 18, 20, and relative speed of angular movement of said discs, the cured thermoset foamed plastic beads may either be of uniform diameter or a mixture of diameters.

The voids (cells) within the beads can either be closed or open, i.e., interconnected, or a mixture of closed and open cells. The specific connection or lack of interconnection of the cells is a function of the compounds used and the proportions of the compounds in the liquid composition, and of the time and parameters of foaming, all of this well known to workers in the art.

Preferably, the composition is so proportioned and includes such compounds that in the finished bead there will be an external skin whereby the beads will be rugged, i.e., non-fragile so as to reduce their tendency toward crushing in handling or under weight. However, it is within the scope of the invention for certain special uses of the beads to so proportion and select the compounds and the chemical liquid composition, in a manner likewise well known to the art, that the beads will not have an external skin.

The ratio of the total volume of the cells to the volume of a bead in any given beads or group of beads can be varied in a fashion well known to workers in the art by varying the gel and curing times, the blowing agent, the blowing activating agent or means, and the ambient temperature and pressure during gelling and curing so that any desired specific gravity for individual beads can be obtained. A typical specific gravity range is from about one-sixtieth to about two-thirds.

It is helpful for accelerating most reactions that result in initial gelling and subsequent curing (setting) of the liquid thermoplastic composition into a thermoset foamed solid in bead form to subject the ascending cloud of droplets to radiant energy, e.g., infrared heating, dielectric high frequency and any arrangement for elevating temperature, and for this purpose the liquid medium in the column preferably is maintained at a temperature of from about 115° F. to about 350° F. The liquid can be raised to and maintained at this temperature by an external heater through which the liquid medium passes as it is recirculated in a manner shortly to be described. Thus the beads can be externally heated by use of a heated liquid medium or can be internally heated by subjection to a field of high frequency dielectric heating. Also combinations of the two can be used.

A typical height for the tube 26 and, hence, the liquid column 24, is from about 10 feet to about 30 feet. This height is selected to be such, taking into account the other variables discussed above, that the beads will be able to pass through the gelled state and optionally into a partially cured state and preferably at least externally partially cured state by the time that the beads have reached the top of the column whereby from this point on there will be no tendency for the beads to coalesce if they are jostled against one another when they take the turn now to be described.

The top of the tube 26 opens into a raceway 28 through which the fluid liquid medium is circulated (as illustrated in a clockwise direction) by any suitable means such, for instance, as a paddle wheel pump 30 driven by a motor 32 located adjacent the opening of the tube in a direction opposite the direction of movement of the liquid medium through the raceway. Hence, the liquid medium carrying the now still curing multicellular foamed thermoset plastic beads will flow through the raceway away from the vertical column without coalescing.

Interposed in the raceway at a point remote from the vertical column is a separation mechanism. As illustrated, the separation mechanism constitutes a conveyor 34. Desirably, although not necessarily, the belt of the conveyor mechanism is of the foraminous type, e.g., a screen belt, which is trained about an upper roller 36 and a lower roller 38. One of the rollers is driven by a motor (not shown). The lower roller and, therefore, the lower end of the belt is adjacent the bottom of the raceway, and the upper roller and, therefore, the upper end of the belt is located above the level of the liquid in the raceway. The lower roller is driven in such a direction that the upper reach of the belt moves upwardly and rearwardly in the direction indicated by the arrow A. The external surface of the belt is at least slightly roughened or provided with transverse flights so that the thermoset beads will be lifted up out of the liquid medium as the belt is driven, the liquid medium dripping down through the lower reach back into the raceway where it is sucked by the pump back across the upper opening of the tube 26.

Some of the liquid in the raceway, after substantially all of the beads have been removed therefrom by the separation mechanism, is recirculated by a motor driven pump 40 from the raceway back to the bottom of the tube 26 so as to encourage the upward flow of liquid with the cloud of droplets and beads therein, whereby reliance is not solely placed upon the buoyant force exercised by the difference in specific gravities of the droplets, beads and the liquid medium.

The substantially liquid-free relatively cured beads are discharged from the upper end of the belt as it travels over the roller 36 on to a horizontal conveyor 42 which leads the beads away from the apparatus 10 for subsequent processing, use or packaging. The residual film of liquid can be removed by heating or vacuum evaporation and, if the liquid is of sufficient value, its vapors can be recovered by condensation and returned to the raceway.

It will be seen from the foregoing that the method of operation of the apparatus 10 is such that a composition is introduced into the bottom of the column in a form which is either liquid or becomes liquifiable at the bottom of the column, that while in liquid form a blowing agent in the composition becomes activated to generate a gas internally of droplets into which the liquid composition is subdivided. These gases expand to form cells within the droplets. The droplets are suspended in a fluid medium, the fluid medium to a substantial extent counteracting the effect of gravity on the droplets so that the droplets become substantially spherical, and the fluid medium further leading the droplets to a separation mechanism where the droplets which are now transformed into multicellular microcellular thermoset plastic foamed beds are extracted from the fluid medium for subsequent use. The composition expelled by the dropletizing mechanism is, as it is expelled or shortly thereafter, in a plastic state, that is to say, a flowable state or what has been referred to hereinbefore as a liquid state, and it is during this state that the formation of the cells is commenced, the formation continuing as the composition first gels and then sets.

Usually the composition becomes liquid, if not already liquid, and then gels and subsequently cures by reaction to form a resinous mass interspersed by cells, and the method of the invention is further characterized by the concurrent formation, while the droplets are in liquid and then gelled state, of gas in situ, thereby enabling the evolved gas to form bubbles. However, the liquid and then gelled droplets are sufficiently viscous to entrap the gas bubbles and the gelation state will hold the bubbles trapped. Of course, upon the solidification of the thermoset resinous mass, the bubbles will be permanently entrapped or at least the cells will be permanently formed. This all takes place within a relatively short time, for instance, within one-quarter minute to five minutes, and preferably about one-half minute to three minutes.

The invention is further characterized by subjecting the mass while still liquid or gelled to a mechanical subdividing action before the mass sets, which action breaks up the mass into small particles, i.e., droplets, which, if they do not immediately assume an approximately spherical shape, will quickly assume such shape while they are suspended in the fluid medium and are being led to the separation mechanism.

A fragment of a typical finished bead made by the just described apparatus and method is illustrated in FIG. 3.

The bead is characterized by a tough skin which is relatively thick when compared with the thin skin formed on the exterior surface of a foamed particle of a thermoplastic resinous material. The bead also is characterized by the presence of a large number of small voids or cells. These cells either may be completely separated by partitions (walls) or some of the cells may have openings in the partitions, both types being illustrated in FIG. 3, and the question of which predominates or is substantially solely exclusive is determined by the specific compounds and proportions thereof used and by ambient circumstances such as pressure, temperature and viscosity, as is well known in the art. However, regardless of whether the cell structure is open or closed or mixed, the use of a thermoset as distinguished from a thermoplastic material enables the unique new beds to have enhanced properties which permit variation, at will and under control, of selected physical properties and structures, intrinsically greater strength, greater resistance to acids, alkalis and organic solvents, better rheological resistance, resistance to heat deformation and selection between open cells and closed cells, tough skin and no skin cells. The beads are far more rugged, tough and strong than formed polystyrene beads so that they are not readily collapsed or broken under pressures to which the beads individually or en masse may be subjected in their various uses.

The new beads of the present invention have many uses of which a few will be mentioned now to illustrate the utility of the invention. One excellent use is to blow a stream of beads into hollow spaces as between walls of a building to act as insulation. The beads also can be poured into such empty spaces for the same purpose. This arrangement avoids the high cost of "in situ" foaming requiring expensive foaming equipment and skilled labor. Another use for the beads is in rotational molding where the beads are used to fill a mold which thereupon is rotated about plural axis while simultaneously subjecting the confined mass of beads to a treatment which renders the surfaces thereof tacky, such, for instance, as spraying the beads with a solvent or adhesive or a solvent vapor. Alternatively, the interior of the mold may have interstices between the beads filled with a continuous phase of a plastisol which is compatible with the thermoset plastic composition of the cured beads and the plastisol converted to a cured condition while being subjected to heat during rotational molding, the heat transforming the plastisol to a solid continuous-phase matrix in which the thermoset multicellular microcellular foamed plastic beads of the invention are embedded. Also, the beads of the invention may be molded in an open mold, this being similar to rotational molding except that the mold need not be fully confined. A further use for the beads is as a cover film over liquids to inhibit evaporation from an exposed surface of the liquid. In this instance, the beads form a multi-beaded light loose layer which floats upon the surface of the liquid, e.g., liquid such as water contained in a reservoir or an open vessel. In this use of the new beads it is preferred for the beads to be of the closed-cell type and rigid so as to minimize evaporation and prevent the beads for absorbing the liquid and sinking to the bottom of the vessel. Obviously, in this case the beads must have a specific gravity which is less than that of the liquid whose otherwise exposed surface they cover. A further use of the beads is to form filter webs or rods. For this purpose the beads are placed in a mold of the desired ultimate form and are adhered to one another as by the use of a solvent or adhesive. The solvent or adhesive treatment is performed in a well-known manner so that preferably the contacting zones principally will be cohered or adhered and the maximum amount of the remaining surface of the beads left exposed. Preferably also in this form of the invention, although not necessarily, the beads are of the open-cell type with the open cells extending to and through the exterior surfaces of the beads, that is to say, with a skin absent or substantially absent so that the maximum filtering effect can be obtained, not only through the interstices between the beads which themselves form a maze, but also through the open cell structures of the beads themselves.

Not to be overlooked is the use of the novel beads for making boards or sheets. These are fabricated by molding methods similar to the open molding method described above. Moreover, the boards also can be formed with the aid of liquid or gaseous solvents or adhesive or a plastisol between broad flat platens. Lastly, by way of example, an excellent use of the unique beads is for lamination. To this end, the beads can be interposed between plies or sheets of other material such as wood, paper, strawboard, metal foil, etc., and secured in place through the use of a liquid or gaseous solvent or adhesives or plastisols. Here, too, the laminating is preferably carried out between platens, although it also may be equally well performed during passage between cooperating rolls.

Although mention has been made before of the gelation time, which essentially is the time from the first intimate intermixing of the chemical compounds in the mixing head to the time that the liquid mixture changes to a semi-solid state in the vertical column, as being about from 15 seconds to 5 minutes, it is preferred that this time be approximately 30 seconds. This time can be controlled in various fashions, for instance, by the temperature of the droplets and beads as they ascend the tube 26 and, therefore, by the temperature of the liquid medium and also by the catalysts and initiators involved in the reaction between the compounds. It also can be controlled by the specific compounds employed and by the proportions between the compounds, all of these parameters being well known to the art. What is to be stressed, moreover, as has been implied heretofore, is that it is essential to the practice of the invention that the evolution by the blowing agent, such, for instance, as carbon dioxide, trichlorofluoromethane, nitrogen, methylene chloride, etc., of gas be either completed or have occurred to a substantial degree concurrently with the end of this time period, or else the foam will either collapse if the evolution of gas is too rapid and completed too early or the beads will fragment if the evolution is too slow; that is to say, if the evolution is too rapid and is completed while the beads are still insufficiently semi-solid, the gas bubbles will migrate to the surface of the beads where the gas will escape through the still-too-fluid skin. The material of the droplet, to prevent this escape, must be sufficiently viscous as evolution of the gas terminates to be able to hold the gas bubbles that are entrapped within the beads. Contrariwise, if the evolution of gas continues to a substantial exent beyond the stage at which the semi-cured material of the beads is readily shiftable by shear, the pressure generated by the gas which still is evolving will burst the bead so as to render it unusable.

The full cure time of the foamed thermoset multicellular microcellular plastic beads is controlled by environmental temperature and also by catalytic action and the particular compounds involved. Generally speaking, providing that the environmental temperature is kept below 150° C. the foamed beads will full cure quickly for most of the thermoset compositions involved and which will be detailed hereinafter and are mentioned in the references hereinbefore set forth. Chemical decomposition could take place above this temperature. Likewise, generally speaking, at room temperature, i.e., at 68° F., full cure could take as long as two days or even more. It is important, however, to the practice of the invention that the cure be sufficiently complete within the vertical tube, i.e., the foaming chamber 26, so that the surfaces of the beads will not autogenously weld to one another upon contact, such as could be caused by jostling or crowding of the beads. Thereby the beads, as they are swept through the raceway and emerge from the tube into the raceway making the sharp turn, will remain discrete.

Mention has been made of a preferred range of temperatures for the foaming chamber. Generally speaking, this temperature is as high as is chemically feasible consistent with the curing conditions, but obviously should not be so high as to cause chemical decomposition of the liquid composition, gelled droplets or cured beads. Moreover, it will be realized that the temperature is capable to some extent of controlling or at least influencing the diameter of the beads being formed; the higher the temperature, the more quickly the beads being cured, so that if they do not fragment, the diameters will be small. It is quite apparent that the other parameters, such as the height of the column, the action of the blowing agent, the particular compounds and the ratio of compounds, the viscosities and surface energies of the liquid medium and the liquid composition as well as the catalytst, initiators and other additives, will likewise control or at least influence the size of the beads.

The size of the openings in the discs 18, 20 is, however, one of the major parameters in controlling or influencing the ultimate size of bead produced. As a rough measure only, the size of the openings will be approximately one-quarter to approximately one-tenth the size of the expanded cured thermoset foamed plastic bead. The bead size also is influenced by the extrusion head pressure, the formulation of the liquid composition and the time of extrusion for any given slug.

Although it has not been shown in FIG. 1, means preferably is included to supply additional liquid medium either to the raceway or to the return of the recirculator to the vertical column 24 to make up for any of the liquid medium which is lost through evaporation and not recovered.

Optionally, the beads, upon leaving the separation zone and after being cleaned of the liquid medium, say, by a blast of hot air, can be dusted with a powder cloud of talc or other inert substance, for instance, diatomaceous earths or with a release agent such as a silicone or quilone to prevent the beads from sticking together and coalescing if there is any tendency for them to do so when they are en masse without a continuous liquid phase interposed between them and before full cure is accomplished.

The gel period principally takes place during the ascent of the droplets and beads in the foaming chamber 26, and the curing principally takes place in the raceway between the top of the foaming chamber and the separation mechanism, the speed of the pump 30 being set to bring abuot the required dwell time of the beads in the raceway before they reach the separation mechanism. Typically, the dwell time is about 2½ minutes during which the cure is substantially completed, at least to the point where the beads will not tend to coalesce or stick to one another.

The description of specific compositions for forming a mixture which during fragmentation is liquid and which subsequently assumes a spheroidal form during passage from the fragmentation zone to the separation zone and also substantially fully cures during this period, will be deferred to a later part of this specification.

Figure 2:
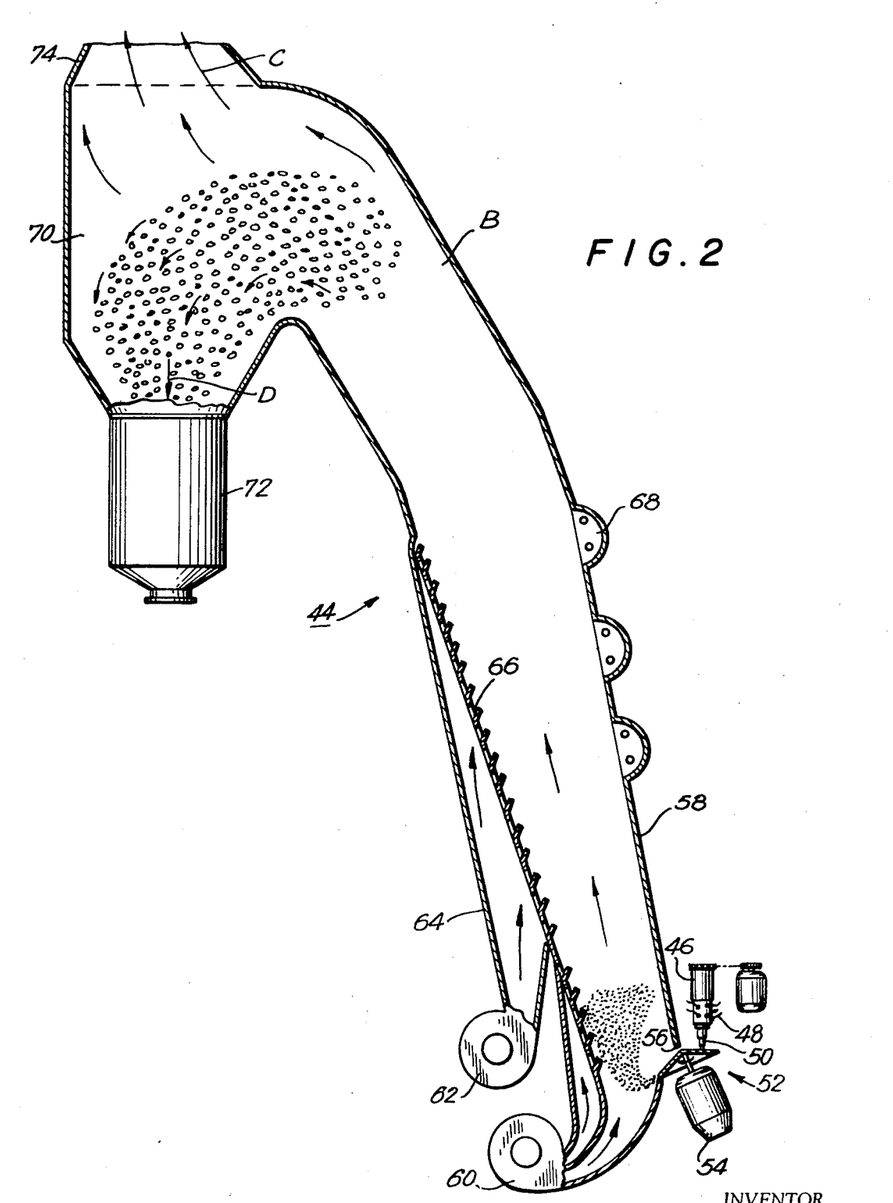
FIG. 2 is a vertical sectional view through another form of apparatus for carrying out the invention.

An alternate apparatus is shown in FIG. 2 and is denoted by the reference numeral 44. This apparatus basically distinguishes from the apparatus 10 in its dropletizing mechanism, its suspension of the droplets during the travel from the dropletizing mechanism to the separation mechanism, in that during spheroidalizing the droplets they are suspended in a column of gas rather than a column of liquid, and in that a different type of separation mechanism is utilized.

Said apparatus 44 includes a mixing head 46 with several inlet hoses 48. The mixing head 46 has an outlet 50 from which there is extruded an essentially liquid stream of a composition including the various compounds necessary to form a thermosettable material which, in this stage, is still in liquid or semi-solid form. This material is discharged on to a dropletizing mechanism 52 in the forof a shallow cone rotated about its axis of symmetry by a motor 54. The stream of the liquid composition strikes the cone inwardly of the circumference at the base thereof. The cone spins so as to impart a peripheral velocity sufficient to discharge, i.e., fling off, a fragmenting film a short angular distance beyond the point at which the liquid composition is discharged from the outlet 50. The fragmentized film, hence, constitutes a multitude of small slugs of the liquid composition. Purely by way of example, a typical spinning cone has a diameter of 1 to 2 feet and is spun at a rotational speed of about 1800 r.p.m. Hence, the circumference of the base of the cone is about 3 to 7 feet. The linear velocity of the base of the cone may be varied from about 500 feet per minute to about 10,000 feet per minute, depending upon the viscosity of the liquid composition and the desired size of the liquid fragments as initially discharged from the dropletizing mechanism. Obviously the size of the fragments discharged will be selected as a function of the size of the ultimate thermoset multicellular microcellular plastic beads which it is desired to produce.

The shallow cone is partially disposed within an opening 56 near the foot of a foam expansion chimney 58 in the form of an erect tube of upwardly flaring shape. A portion of the cone is external to the chimney and it is there that the liquid composition is deposited from the outlet 50. Another portion of the cone is located within the opening 56, and the speed of the cone and angle of its slope are so designed for the particular composition and other parameters that the droplets will be discharged from the periphery of the base of the cone before the cone re-emerges from said opening 56.

At the foot of the chimney the fluid medium is introduced. In this form of the invention the medium is gaseous, as previously mentioned. Typically, the medium is air, steam, nitrogen, carbon dioxide and the like, to wit, gases, which meet the qualifications described for the liquid medium heretofore, i.e., immiscibility with the composition of the droplets, chemical inertness with said composition, a surface energy level different from that of the droplets, in this instance a lower specific gravity than the droplets, and characterized by its ready removability from the set (cured) beads.

The gas is pumped into the bottom of the chimney in any suitable fashion, such, for instance, with the assistance of a motor driven blower 60. This is a high volume blower which delivers the gas at a speed such that the gas will travel to the top of the chimney in about 30 seconds to a minute and even as long as 5 minutes. Typically, the blower introduces gas into the bottom of the chimney at the rate of about 2,000 cu. ft. per minute which is sufficient to cause a rate of ascent of the gas in the chimney from about 15 to about 80 feet per minute. The temperature of the gas is about 115° F. to about 400° F., a typical temperature being 200° F. A typical vertical height for the chimney is from about 15 to about 40 feet. By way of example, an excellent vertical height is 20 feet.

It will be appreciated that the upwardly ascending gas carries with it a cloud of droplets which are forming into spheroidal shape and foaming as they ascend and which are gelling at the same time, so that the semi-solid state and substantial termination of blowing occur at approximately the same time, the foaming and passage through the liquid and gelation state taking place concurrently.

In a preferred form of the invention, as shown in FIG. 2, in addition to off-setting gravity effects by virtue of the upward movement of air delivered into the foot of the chimney by the high volume main blower 60, there is provided an auxiliary smaller counter-gravity blower 62, the outlet from which is discharged into a manifold 64 that has several openings constituting successively higher horizontal slots 66 in an inclined side wall of the chimney 58, this being the wall which is on the left side as shown in FIG. 2 and may be referred to as the lower wall inasmuch as it faces in a somewhat downward direction in contradistinction to the opposite wall which faces in a somewhat upward direction. The gas issuing from the auxiliary blower desirably is the same as, although not necessarily so, the gas issuing from the main blower, inasmuch as this makes recovery of the gas, if such is desired, simpler. The temperature of the gas issuing from the auxiliary blower desirably is approximately the same as that of the gas issuing from the main blower since this results in more efficient operation.

It is also within the scope of the invention to employ auxiliary heating means such as high intensity radiant heaters 68 which play upon the upwardly moving stream of gas and cloud of gelling and curing droplets.

The height of the chimney is such that, in combination with the temperatures employed, the speed of the upwardly moving gas stream, the particular compounds utilized and the proportion of the compounds, it will result in substantial completion of the gelling at about or shortly prior to the time that the droplets reach the top of the chimney denoted by the point B. Preferably, moreover, by the time that the droplets reach this point, they are at least semi-cured or cured to a state that they will retain their spheroidal shape under mild pressures and will not stick to other droplets which they may contact. Desirably the cure, therefore, is quite complete by the time the droplets reach the point B.

From the point B upwardly the stream of gas leaving the chimney 58 enters a separation mechanism constituting a chamber 70 having a substantial vertical dimension. At the bottom of the chamber there is provided one or more accumulating bins 72, and from the top of said mechanism a fume and gas exhaust vent 74 extends upwardly and either out to the atmosphere if the fumes not be noxious or through a scrub filter and/or cleaner if the fumes are harmful or inducive of industrially or civically non-desirable conditions. The arrows C indicate the direction of flow of the fumes and gas exhausted from the apparatus 44, while the arrow D indicates the direction of the beads, which, no longer carried upwardly by the stream because of the sudden enlargement upon discharge into the chamber 70, are no longer suspended against the force of gravity and drop into the bins 72. The bottoms of the bins are removably closed so that when the bins are full the bottoms can be opened to permit gravity or suction discharge of the stored cured multicellular microcellular thermoset plastic spheroidal beads. It is desirable to employ two or more accumulating bins so that one bin can be emptied while the other bin is being filled, and so that it is not necessary to fully empty any one bin at a time and possibly interfere with the balance of forces which permit the "dead" beads (no longer fully suspended against the force of gravity by the upwardly moving stream of gas) to drop into said bins.

It should be mentioned that during the upward movement of the liquid and gelling droplets they will change their shape from any non-spheroidal form in which they may be discharged from the dropletizing mechanism into a spheroidal form while the beads are suspended in the gravity-countering field of said upwardly moving gas stream.

The beads may be dusted or coated upon introduction into the accumulating bins or discharged therefrom with the same type of materials as those mentioned for coating of the beads discharged from the apparatus 10. Preferably the cure time before the beads are finally dropped into the accumulating bins is sufficient to prevent coalescence of the now-crowded-together beads.

Mention has been made heretofore, in connection with both forms of apparatus, to mixing heads and a general description thereof has been given. Details of such mixing heads are illustrated in many U.S. patents and various publications, for example, patents and publications owned and issued by Mobay Chemical Co. Another suitable type of mixing head including conventional metering and auxiliary equipment is shown and described in a brochure entitled "Equipment for Metering, Mixing and Dispensing Urethane, Epoxy and Polymer Formulations" written by the present inventor and published in the 1964 edition of "Modern Plastics Encyclopedia."

Note also should be taken of the fact that in both above-described forms of the apparatus the dropletizing action which is achieved mechanically is enhanced by the slugs of liquid composition being struck by a stream of moving fluid, which, particularly in the case of the apparatus of FIG. 2, may be traveling at quite a rapid speed.

The types of thermoset plastics used in the beads of the invention include, by way of example, polyurethanes, epoxies and condensation resins.

In general, the compounds entering into the reaction for the production of polyurethane foamed beads are isocyanates and compounds containing active hydrogen ions, for instance, polyols. In adddition, a blowing agent is incorporated for the purpose of foaming. Other conventional additives also may be included.

A typical urethane foaming equation is well known and is generally designated as $$\cdots-N=C=O + HO-\cdots \longrightarrow \cdots-N-C-O-\cdots$$
isocyanate    polyol              urethane For the blowing reaction the standard isocyanate/water interaction may be employed, viz, $$\cdots-N=C=O + H_2O \longrightarrow \cdots NH_2 + CO_2\uparrow$$
isocyanate    water              carbon dioxide gas The result of these reactions occurring concurrently leads to the formation of the polyurethane foam. Other blowing agents can be substituted such, for instance, as any of the Freons, e.g., Freon 11 and Freon 12, which would be introduced in liquid form into the mixing head and activated by subjection to heat in the foaming chamber or volatile liquids in general. Alternatively, gas-releasing couples of other known types can be utilized.

Specific examples of isocyanates are (1) 2:4 tolylene diisocyanate (2) 2:6 tolylene diisocyanate (3) 1:6 hexamethylene diisocyanate

O=C=N—(CH$_2$)$_6$—N=C=O (4) Diphenylmethane 4-4' diisocyanate (5) Triphenylmethane 4-4'-4" triisocyanate Moreover, in lieu of such isocyanates, there may be employed isocyanates containing compounds, e.g., those obtained by the reaction R—N=C=O + HO—⟨⟩ ⟶ R—N—C—O—⟨⟩
isocyanate     phenol         phenol "blocked" isocyanate hence, all the examples of isocyanates can also be phenol "blocked," e.g.

2:4 tolylene diphenyl carbamate
2:6 tolylene diphenyl carbamate
1:6 hexamethylene diphenyl carbamate
Diphenylmethane 4-4' diphenyl carbamate
Triphenylmethane 4-4'-4" triphenyl carbamate Also usable are isocyanates obtained by the following recations:

a triisocyanate from 2:4 tolylene diisocyanate and trimethylolpropane

For the active hydrogen containing chemicals there may be utilized any of those known in the art, such as alcohols, ethers, esters, amines, acids and related compounds. There are so many of these compounds which are known and used and which are mentioned, for example, in the aforesaid references, that the list thereof would be unduly long. However, by way of example, the following are given:

Monohydric alcohols, e.g.

ROH where R can be $C_6H_{11}$, $C_8H_{17}$, $C_{10}H_{21}$, . . . $C_{18}H_{37}$ Diols and triols, e.g.

Ethylene glycol $$HOCH_2CH_2OH$$

Propylene glycol $$CH_3CHOHCH_2OH$$

Trimethylol propane

Glycerol

Trimethylene glycol

Phenol

*Ethers, e.g.*
Poly (1,4 oxytetramethylene)glycol
Poly (1,4 oxypropylene) glycol
Poly (1,4 oxyethylene) glycerol

*Esters, e.g.*
Glyceryl triricinoleate
Polypropylene sebacate
Salycyl adipate

*Amines, e.g.*
Ethylene diamine
N,N dimethyl benzylamine

*Acids, e.g.*
Phthalic anhydride
Linoleic acid
Oleic acid

In general, the compounds entering into the reaction for the production of the epoxy foamed beads are bisphenol-A and epichlorohydrin or related chemicals mixed with blowing agents. Upon heating such mixtures a controlled release of gas occurs and simultaneously therewith an epoxy compound is formed as a thermoset foamed mass after first passing through a liquid and gelling stage.

In general, the compounds entering into the reaction for the production of condensation resin foamed beads are urea and formaldehyde, and phenol and formaldehyde, or related chemicals such as cresol and resorcinol. Those materials may be in the form of syrups and solutions. The syrups and solutions when mixed with chemicals which either release gas by chemical reaction, as in the case of the urethanes, or by heating when the mixture contains a volatizable agent such as a Freon, results in a condensation resin type of foamed bead.

Many specific formulations for thermoset plastics, all of which are suitable for use in the practice of the present invention where the period from mixing through gelation to sufficient curing for handling, i.e., to prevent coalescence or cohesion, at temperatures and times specified above for the apparatuses described, are set forth in the references listed previously. Indeed, practically all of the formulations, except those with extremely long times for curing sufficient for handling purposes, are useful inasmuch as even curing times (sufficient for handling) of several hours at room temperature will be reduced to the required short curing time (sufficient for handling) of the present invention in the presence of the elevated temperatures employed in the operation of the aforesaid apparatuses. Nevertheless, for the sake of completeness, there have been set forth below several specific examples of formulations and parameters for the production of different multicellular microcellular thermoset plastic foamed beads.

EXAMPLE I

Mix together at 75° F. in either mixing head:

| | Parts by weight |
|---|---|
| Polyoxyalkylene derivative of propylene oxide of nominal molecular weight about 1500 to 3000 | 100 |
| 80/20 mixture of the 2:4 and 2:6 isomers of tolylene diisocyanate | .48 |
| N,N-dimethyl-$\beta$-phenylethylamine (accelerator) | 0.3 |
| Water soluble organo-silicone copolymer (controls uniformity of cell structure) | 3.5 |
| Stannous octoate (accelerator) | 0.25 |
| Water (blowing agent) | 3.5 |
| Trichlorofluoromethane (blowing agent) | 10 |

The resulting mixture will produce flexible open-celled polyether foam beads.

Two examples of polyoxyalkylene derivatives are:
(1) The polymer created by reacting propylene oxide with trimethylol propane giving a poly (oxy propylene) triol of molecular weight 3000.
(2) The polymer created by reacting propylene oxide with propylene glycol giving a poly (oxy propylene) glycol of molecular weight 1600.

EXAMPLE II

Batch mix together at 20° C.:

| | Parts by weight |
|---|---|
| Polyoxyalkylene derivative of ethylene and propylene oxide of nominal molecular weight 3600 | 100 |
| 80/20 mixture of the 2:4 and 2:6 isomers of tolylene diisocyanate | 45 |
| N,N-dimethyl benzylamine (accelerator) | 0.6 |

The above mixture after a period of 1 hour is then mixed in either mixing head at 30° C. with:

| | |
|---|---|
| N,N-dimethyl-$\beta$-phenylethylamine | 0.2 |
| Water soluble organo-silicone copolymer | 4.0 |
| Dibutyl tin dilaurate (accelerator) | 0.05 |
| Water | 5.0 |

The resulting mixture will produce flexible partially open-celled, partially closed-celled polyurethane foam beads.

EXAMPLE III

Mix together at 30° C. in either mixing head:

| | Parts by weight |
|---|---|
| A polyester resin based on adipic acid and glycerols and related products | 100 |
| Fumed silica (foam stabilizer and filler) | 1 |
| Diphenylmethane diisocyanate | 60 |
| Tris-$\beta$-chloroethyl phosphate or tris-$\beta$-bromophosphate (flame retardant and chemically active in the formation of the polymer structure) | 15 |
| Triethylamine (accelerator) | 2.6 |
| N-ethylmorpholine (accelerator) | 0.4 |
| Water | 3.0 |
| Water soluble organo-silicone copolymer | 3.0 |

A typical polyester resin is that created by reacting adipic acid, ethylene glycol and glycerin to form the resin a polyester resin of molecular weight of about 2000 and hydroxyl number 50–65 with an acid value of 1–4. The R is that of the glycol and glycerin, and the R' that of the adipic acid. The fumed silica is a product known as "Cabosil" made by the Geoffrey Cabot Corp. It is a pyrogenic colloidal silica in the physical form of a light, fluffy flake-like powder.

The resulting mixture will produce rigid polyester foam beads with an open cell structure.

EXAMPLE IV

Mix together at 25° C. in either mixing head:

| | Parts by weight |
|---|---|
| A polyoxyalkylene derivative of propylene oxide of nominal molecular weight of about 1000 | 100 |
| Trichloro fluoromethane (blowing agent) | 50 |
| Tris $\beta$ chloroethyl phosphate | 30 |
| Dibutyl tin dilurate | 0.5 |
| Water soluble organo-silicone copolymer | 1.0 |
| Glycerol (viscosity reducer and chemical reactant with the isocyanate) | 10 |
| Diphenylmethane diisocyanate | 180 |

The resulting mixture will give closed-cell rigid polyurethane foam beads.

EXAMPLE V

Mix together at 25° C. in either mixing head:

| | Parts by weight |
|---|---|
| A polyoxyalkylene resin produced from glycerol, propylene oxide and ethylene oxide, the molecular weight being in the range of about 1500 to 3000 | 100 |
| 80/20 mixture of the 2:4 and 2:6 isomers of tolylene diisocyanate | 48.5 |
| Water | 3.8 |
| Triethylamine | 0.2 |
| Stannous octoate | 0.3 |
| Water soluble organo-silicone copolymer | 1.5 |
| Trichlorofluoromethane | 7 |

The resulting mixture will give open cell very flexible polyether foam beads.

EXAMPLE VI

Mix together at 25° C. in either mixing head:

| | Parts by weight |
|---|---|
| A polyoxyalkylene triol of nominal molecular weight about 450 | 80 |
| A polyoxyalkylene pentol of nominal molecular weight about 600 | 20 |
| Trichlorofluoromethane | 50 |
| 80/20 mixture of 2:4 and 2:6 isomers of tolylene diisocyanate | 51 |
| N,N dimethyl β phenylethylamine | 2.5 |

The resulting mixture will give closed cell rigid polyurethane foam beads.

EXAMPLE VII

Mix together at 25° C. in either mixing head:

| | Parts by weight |
|---|---|
| Bisphenol-A/epichlorohydrin liquid resin | 100 |
| Liquid polyamide | 80 |
| Benzyl alcohol (viscosity reducer) | 12 |
| Methylene chloride (blowing agent) | 7 |
| 2,4,6-tris (dimethylamino methyl) phenol (curing agent) | 9 |

The foregoing bisphenol-A/epichlorohydrin resin is

EXAMPLE VIII

Mix together in either mixing head and heat to 140° C.:

| | Parts by weight |
|---|---|
| Urea formaldehyde resin syrup | 100 |
| and previously mixed together: | |
| Polyoxyalkylene resin of nominal molecular weight of about 3000 | 100 |
| 80/20 mixture of the 2:4 and 2:6 isomers of tolylene diisocyanate | 40 |
| N,N dimethylbenzylamine (accelerator) | 0.6 |
| and previously mixed together: | |
| Triethylamine | 0.3 |
| Water soluble organo-silicone copolymer | 4.0 |
| Stannous octoate | 0.1 |
| Water | 4.0 |

The resulting mixture will produce open-celled semi-rigid urea-formaldehyde type foam beads.

EXAMPLE IX

Mix together in either mixing head and heat to 140° C.:

| | Parts by weight |
|---|---|
| Phenol formaldehyde resin syrup | 200 |
| and previously mixed together: | |
| Polyoxyalkylene resin of nominal molecular weight of about 3600 | 100 |
| 80/20 mixture of the 2:4 and 2:6 isomers of tolylene diisocyanate | 30 |
| N,N dimethyl benzylamine | 0.6 |
| and previously mixed together: | |
| N,N dimethyl phenethylamine | 0.3 |
| Water soluble organo-silicone copolymer | 4.0 |
| Dibutyl tin dilaurate | .05 |
| Water | 5.0 |

The resulting mixture will produce rigid phenol formaldehyde-type foam beads.

With respect to the foregoing 9 examples, either of the two apparatuses described with respect to FIGS. 1 and 2 can be employed.

For Examples I–VI the gel time is approximately one-half minute and the time to make microcellular multicellular thermoset plastic beads sufficiently cured for where n has an average value (between 0 and 12) of 6, with an epoxide equivalent of 190 and an average molecular weight of 370.

The liquid polyamide is where R is the substituted cyclohexene ring of dilinoleic acid and R' is diethylene triamine.

The function of the polyamide is to perform a chemical reaction with the epoxy resin.

The resulting mixture will upon heating produce rigid closed cell epoxy foam beads.

handling is about another two-and-one-half minutes, so that the dwell time in the foaming chamber of either of the two apparatuses should be adjusted by controlling the rates of flow of the fluid media to obtain about three minutes (in the apparatus of FIG. 1 the curing period can include the period during which the beads are in the raceway). The liquid medium, if the apparatus of FIG. 1 is employed, is trichlorotrifluoroethane fluid at a temperature of about 47° C. The size of the openings in the plates of the dropletizing mechanism will depend upon the size of bead ultimately to be obtained and will be about one-quarter of the ultimate bead diameter. The height of the liquid column is at least 20 feet. The pressure differential at the outlet of the mixing head is sufficient to overcome a 20-foot head of the aforesaid liquid fluid which has a specific gravity of 1.58. The surface tension of the liquid fluid is 19 dynes/cm. at 25° C.

For Examples VII, VIII and IX the gel time is slightly under one-half minute and the curing time to make microcellular multicellular thermoset plastic beads sufficiently cured for handling is about another three minutes, so that the dwell time in the foaming chamber of either of the two apparatuses should be adjusted by controlling the rates of flow of the fluid media to extend over a period of about three-and-one-half minutes (in the apparatus of FIG. 1 the curing period can include the period during which the beads are in the raceway). The liquid medium, if the apparatus of FIG. 1 is employed, is a mixture of high boiling aliphatic paraffins at a temperature of about 150° C. The size of the openings in the plates of the dropletizing mechanism will depend upon the size of bead ultimately to be obtained and will be about one-quarter of the ultimate bead diameter. The height of the liquid column is at least 20 feet. The pressure differential at the outlet of the mixing head is sufficient to overcome a 20-foot head of the aforesaid liquid fluid which has a specific gravity of 0.8. The surface tension of the liquid fluid is 29 dynes/cm. at 25° C.

The operational parameters useful with the foregoing examples in the apparatus of FIG. 2 are, for the first six examples, a chimney height of about 25 feet, air as the gas and a temperature of about 60° C. for the air blown into the chimney. For Examples VII, VIII and IX the height of the chimney is about 30 feet, air is the gas and its temperature is about 150° C.

Although only two specific types of dropletizing mechanism have been described, it will be understood that other alternative structures can be employed, as, for example: fragmenting by passage through a screen and gravity fall through a suspending fluid, mechanical rupture by impingement of a gas stream as has been briefly alluded to heretofore, frothing and blowing the froth apart, and forcing the liquid thermosettable composition under high pressure into the base of a liquid foaming chamber, the impingement force of the jet into the liquid causing fragmentation of the thermosettable liquid composition.

Thus it will be seen that there are provided apparatuses, methods and beads which achieve the various objects of the invention and which are well adapted to meet the conditions of practical use.

As various possible embodiments might be made of the present invention and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. A method of making microcellular multicellular thermoset plastic foamed beads, said method comprising the steps of providing a body of liquid thermosettable composition essentially free of solvents and esseitially consisting of interactable compounds and a blowing agent which composition upon interaction of the compounds passes from a liquid state through a gelled state to a cured state, with the use of at least one solid movable mechanical element in contact with said body and while the body is in said liquid state mechanically fragmentizing the body into liquid droplets, introducing the liquid droplets into a fluid medium in which the liquid droplets are suspended so as to reduce the effect of gravity and permit the liquid droplets to assume a spheroidal configuration, said fluid medium functioning solely as a carrier, said fluid medium being physically and chemically inert to the composition and compounds and being at a temperature below the decomposition temperatures of said composition and compounds, activating the blowing agent while the liquid droplets are in the fluid medium so as to cellulate the droplets and so as to expand the liquid droplets into beads, the fragmentizing and blowing being so controlled as to form, upon expansion of the droplets, beads of a size between about $\frac{1}{100}$ and $\frac{1}{4}$ of an inch, said activation taking place during the time that the droplets are in liquid state and subsequently in gelled state, and up to but not beyond the time that the droplets are cured sufficiently for handling so as to prevent collapse of fragmentation of the droplets, then transporting the fluid medium with the droplets suspended therein to a separation zone and finally at the separation zone extracting the beads from the fluid medium.

2. A method as set forth in claim 1 wherein the fluid medium is a gas.

3. A method as set forth in claim 1 wherein the fluid medium is a liquid.

4. A method as set forth in claim 1 wherein the temperature of the fluid medium is elevated to accelerate the gelation and curing times.

5. A method as set forth in claim 1 wherein the dropletizing is performed by depositing the liquid thermosettable composition from the body on a spinning surface so that the composition is flung in the form of droplets from the periphery of the surface.

6. A method as set forth in claim 1 wherein the dropletizing is performed by passing the fluid composition of the body through openings which are intermittently blocked.

7. A method as set forth in claim 1 wherein the liquid composition is selected from the class consisting of materials which react and cure to form urethanes, epoxies, phenol formaldehydes, resorcinol formaldehydes, melamine formaldehydes, urea formaldehydes, polyester resins and polycarbonates.

8. A method set forth in claim 1 wherein the fluid medium is maintained between temperatures of from about 115° F. and about 400° F.

9. A method as set forth in claim 1 wherein the fluid medium is gaseous and the liquid droplets are carried by the gas up a chimney to a separation zone at which the beads drop while the gas escapes upwardly.

10. A method as set forth in claim 1 wherein the fluid medium is liquid and carries the liquid droplets up a chimney to a raceway where the beads are circulated with the fluid medium to a separation zone from which the beads are extracted after the same are cured.

References Cited

UNITED STATES PATENTS

| | | | |
|---|---|---|---|
| 1,428,526 | 9/1922 | Bradley et al. | 264—8 |
| 2,358,068 | 9/1944 | Hiller | 264—8 |
| 2,543,069 | 2/1951 | Shabaker | 264—8 X |
| 2,797,201 | 6/1957 | Veatch et al. | 264—53 X |
| 2,918,701 | 12/1959 | Hull et al. | 264—14 X |
| 2,951,262 | 9/1960 | Dorman et al. | 264—5 X |
| 3,027,266 | 3/1962 | Wikne | 264—42 |
| 3,207,818 | 9/1965 | Marshall | 264—14 |
| 3,266,085 | 8/1966 | Nacke | 264—8 X |
| 3,320,338 | 5/1967 | Lemelson | 264—14 |
| 3,371,053 | 2/1968 | Raskin | 264—53 X |
| 3,376,366 | 4/1968 | Clark | 264—5 X |
| 3,432,579 | 3/1969 | Zavasnik | 264—5 X |
| 3,472,801 | 10/1969 | Lerman et al. | 264—5 X |

FOREIGN PATENTS

| | | | |
|---|---|---|---|
| 530,319 | 9/1956 | Canada | 264—5 |

OTHER REFERENCES

Brandrup, J., Editor: Polymer Handbook, New York, Interscience, © 1966, pp. IV–218 through IV–220.

PHILIP E. ANDERSON, Primary Examiner

U.S. Cl. X.R.

18—2.6; 161—168, DIG 5; 260—2.5 AM, 2.5 BD, 2.5 AZ, 2.5 B, 2.5 E, 2.5 EP, 2.5 F, 2.5 N; 264—8, 14, 54, DIG 6